United States Patent [19]

Graf et al.

[11] 3,838,401

[45] Sept. 24, 1974

[54] STORAGE MEDIUM, METHOD FOR RECORDING INFORMATION THEREON, AND APPARATUS FOR RETRIEVING THE INFORMATION THEREFROM

[75] Inventors: Peter Graf, Muenchen; Dieter Roess, Planegg, both of Germany

[73] Assignee: Siemens Aktiengesellschaft, Berlin & Munich, Germany

[22] Filed: June 21, 1971

[21] Appl. No.: 154,799

[30] Foreign Application Priority Data

June 25, 1970 Germany.................. P 20 31 515.5

[52] U.S. Cl... 340/173 LM, 340/173 TP, 346/77 R, 350/162 R

[51] Int. Cl......................... G11c 13/04, G11c 11/46

[58] Field of Search................ 340/173 LT, 173 TP; 346/77 R, 77 E; 350/3.5, 162 SF, 162 R

[56] References Cited

UNITED STATES PATENTS

| | | | |
|---|---|---|---|
| 3,335,413 | 8/1967 | Glenn | 340/173 |
| 2,985,866 | 5/1961 | Norton | 340/173 |
| 3,055,006 | 9/1962 | Dreyfoos et al. | 346/74 |
| 3,618,048 | 11/1971 | Pennington | 340/173 |

*Primary Examiner*—Terrell W. Fears
*Attorney, Agent, or Firm*—Carlton Hill et al.

[57] ABSTRACT

A storage medium, method for recording information on the medium and apparatus for retrieving the information in which the information is stored as an alteration in the storage medium which alteration causes a phase modulation of a beam of light used in retrieving the information. For example the alteration may be either an internal alterations, either a cross linked molecules of a plastic storage medium, or the bleaching of the exposed photographic materials to produce light transmitting silver salts having a different index of refraction than the unexposed portions, or the formation of a surface relief to cause a phase modulation of a laser beam projected through the medium or reflected thereby. The formation of the surface reliefs can be accomplished by plastically deforming the surface of the medium, by fusing, by locally evaporating portions of the surface of the medium, or by local etching. Apparatuses for retrieving the information can include either filters or phase shifters which change a phase modulated beam of light into intensity modulated or amplitude modulated beam of light.

1 Claim, 3 Drawing Figures

PATENTED SEP 24 1974 3,838,401

STORAGE MEDIUM, METHOD FOR RECORDING INFORMATION THEREON, AND APPARATUS FOR RETRIEVING THE INFORMATION THEREFROM

BACKGROUND OF THE INVENTION

1. Field Of The Invention

Present invention relates to a storage medium for information in which the information is stored in a manner to cause a phase modulation of the retrieving light beam, the processes of recording the information on the storage medium and apparatuses for retrieving the storage information.

2. Prior Art

A large number of devices for storing information such as magnetic tape electrostatic devices and other types of storage devices are used for many diverse purposes of storing information for example in data processing, for the storage of sound recordings, and for the storage of video recordings. Depending on the type of use, different requirements are placed on each of these types of storage devices with respect to the storage capacity, access time and interference security.

One of the examples of above types of storing devices is the storage on photographic film. Not only are images such as pictures stored on the film, but also sound tracks have been recorded. In recording sound tracks on a photograph, the speech or musical signals are utilized to modulate the intensity of a light source which is projected onto the moving film so that the sound signals are recorded on the film in the form of different degrees of exposure. To retrieve the information, a light beam is projected through the sound track, and depending upon the dark and light spots on the sound track, an intensity modulated beam is created which is then used to reproduce the sound recorded on the photographic film. It has also been known to record in a similar manner video signals such as from a television broadcast on a photographic film. A disadvantage with the known processes for recording on a tape is the high susceptibility to interference security due to a small signal to noise ratio between the recorded signal and the background noise.

SUMMARY OF THE INVENTION

The present invention is directed to a storage medium having information recorded thereon which has a high signal to noise ratio to produce a high interference security. The storage medium such as a band or tape has generated therein by the method of the invention alterations which are either surface alterations or internal alterations to cause a phase modulation in the information retrieval light beam with the phase modulation being in response to the information stored on the tape or band. The alterations in the band of material can be surface reliefs which can be formed by etching such as a glass or a metal storage medium, plastically deforming the surface relief in metal or plastic material, or created by melting or evaporation a portion of the surface of the medium. Internal alterations can be caused by partially cross linking molecules of the plastic material of the storage medium, bleaching of an exposed photo layers to render them transparent, or other chemical treatments. Devices for retrieving the information from the storage medium include means such as a filter for converting a phase modulated beam into an intensity modulated beam or means for converting a phase modulated beam by means of a phase shifter into an amplitude modulated beam for detection.

Accordingly, it is an object of the present invention to provide storage medium in which information is stored to cause phase modulation of a retrieval of a beam of light used in reading the recorded information, a process for recording the information, on the storage medium and an apparatus for retrieving the information therefrom.

Another object of the present invention is to provide a storage medium in which the information is recorded in the form of a surface relief and the process for recording the information as a surface relief on the storage medium.

A still further object of the present invention is to provide a storage medium in which the information is recorded as an internal alteration of the material and a process for recording the internal alterations of the material.

Other objects, features and advantages of the present invention will be readily apparent from the following description of the preferred embodiments thereof taken in conjunction with the accompanying drawings although variations and modifications may be effected without departing from the spirit and scope of the novel concept of the disclosure.

DESCRIPTION OF THE PREFERRED EMBODIMENTS

Figure 1:
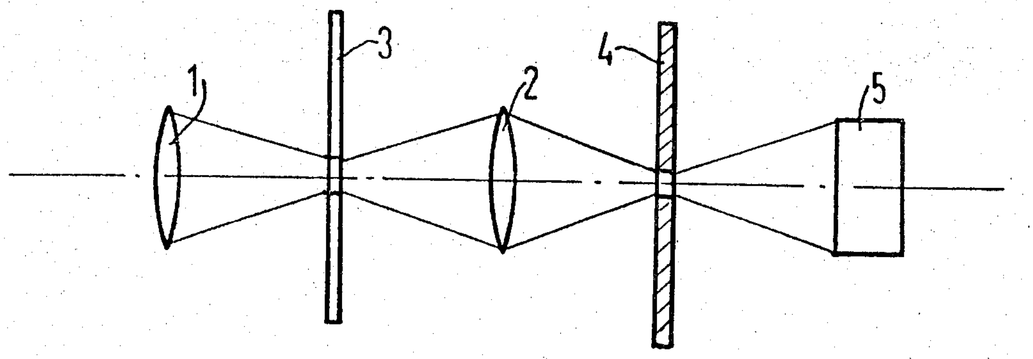
FIG. 1 is a schematic presentation of an apparatus for retrieving information recorded on a storage medium according to the present invention.

The principles of the present invention are particularly adapted to a storage means on which the information to be recorded therein is recorded by generating or creating local modifications or alterations of the material of the storage medium which alterations cause a phase modulation of a beam of light such as a laser beam utilized to retrieve the information from the storage medium. For example if the beam of light used for the purposes of retrieving the information is projected onto the storage means to be reflected therefrom, the modifications or alterations of the storage material of the storage medium can be surface reliefs or contours which cause a phase modulation of the reflected retrieving beam with the amount of modulation corresponding to the information recorded on the medium. If the retrieval beam is projected through the storage medium, then the modifications or alterations can be either a surface relief or an internal modification of the material of the storage medium which causes phase modulation of the retrieval beam of light in response to the information stored on the medium. Finally, the information may be recorded on the storage medium as a modification or alteration having a specific geometrical structure which causes a retrieval beam passing through the material to be phase modulated and defracted into a defraction pattern having a specific figure or outline which is detected to indicate the presence of the bit of information recorded on the storage medium.

If the information is retrieved by passing a light therethrough, the storage medium is light transmitting material which may be in a form of a flexible band or tape of thermoplastic material, or a rigid structure such as glass plates. If the retrieval beam is reflected from a surface of the storage medium with the reflected wave being modulated to impart the information retrieved from the medium, the storage medium can be either a rigid glass plate or flexible metal or plastic bands or tapes which reflect the retrieval beam.

To record the information onto the storage medium, the information to be recorded is received and utilized by means for generating the modification or alteration of the storage medium in response to the information to be recorded. An example is digital information which is mechanically recorded into the storage medium by using a very thin rod or diamond needle to emboss or impress a surface relief corresponding to the information to be recorded. Another example of mechanically altering the surface of the storage medium is by recording information in the form of digital data which uses anembossing tool to emboss a fixed geometric shape such as a triangle into the surface for each bit of digital information.

Other processes for recording the information as a surface contour or relief uses a high power pulse laser modulated by the information to be recorded to locally evaporate or burn portions of the surface of the storage means such as metal bands, tapes or plastic tapes or films to record the information.

Instead of using a laser beam to remove the surface material, an information modulated beam such as a laser is projected onto a thermoplastic material of the storage medium. The laser beam in those areas of the thermoplastic material exposed will cause the molecules of the thermoplastic material to be altered or modified by crosslinking. A solvent can then be selected which will selectively dissolve either the altered or the unaltered portion of the thermoplastic material and by treating the storage medium, portions of the surface will be dissolved to provide a surface relief or contour corresponding to the information recorded by the modulated laser.

Another process of providing a surface embossment or relief is etching the surface by a method similar to a photo etching method. A photo sensitive resist material is deposited on the surface and exposed by a modulated light beam to provide an etching mask of a desired pattern. Then the exposed surface is etched to create the surface relief. Such a method can be used with a storage medium such as glass, or some of the metal storage bands or tapes.

As mentioned above, the modification or alteration of the band such as plastic bands can be an internal modification. One process or recording the information in a storage medium by internal modification is by modulating a light source such as a laser which causes molecular cross linking in the storage medium such as thermoplastic materials which cross linking results in an altered molecular structure. The altered cross linked molecular structure has a different index of refraction than the unaltered molecular structure so that a retrieved beam of light is defracted in a different manner by altered portion than by the unaltered portion to cause a phase modulation of the retrieval beam. Another process for recording on a storage area is by providing a photographic emulsion layer on the surface of the storage medium, exposing the photographic emulsion layer by a light beam which is modulated in accordance with the information to be recorded, subsequently developing and fixing the storage medium which will result in dark and light spots due to the exposure pattern. Then the film is bleached to cause the darkened spots to become silver salts which have a different index of refraction than the unexposed portions of the emulsion. Thus the retrieval beam will be phase modulated by the portions with different refraction indexes.

In each of the above processes, the material required for the storage medium is inexpensive in comparison with previously known materials, and the recorded signal or information has both a high signal to noise ratio and a high interference security to achieve a high interrogation efficiency. The light passing through the storage medium in the interrogating or retrieving of the information is not absorbed or dampened and is only phase modulated. Thus the modulation of the phase enables a high signal to noise ratio to be established.

Some specific examples of processes for recording the information on the storage medium are described hereinbelow.

EXAMPLE 1

In this example, the storage medium comprises a layer or web of multi-layers with a layer of transparent thermoplastic, a layer of transparent photo-conductive material and a layer of electrically conducting clear glass with the photo-conductive material between the glass and plastic layers. The information will be recorded in the form of surface reliefs provided on the surface of the layer of plastic material by the following process. The outer surface of the thermoplastic material is charged using a corona charging device similar to those used in electrostatic printing devices to be covered with a uniformly distributed positive charge which influences a negative charge on the boundary surface between the glass layer and the photo conductor which glass layer is connected to ground. In the charge condition, the storage medium is exposed by a light beam modulated with the information to be recorded which causes the photo-conductive material to be conductive in those areas on which the light strikes but to remain as an insulating material in those areas which do not receive light. As a result of the light striking the layer of photo-conductive material, the negative charge migrates through the photo-conductive material to the boundary surface of the plastic layer. Thus, the evenly distributed layer of positive charges on the outer surface of plastic layer is opposed by a negative layer in the areas where light was projected that is at the boundary layer between the photo-conductive material and the plastic material and at the boundary layer between the photo-conductive material and the conductive glass in those areas which do not receive any light pattern. Subsequent to this exposure, a second charging is applied to render the system insensitive to further exposure to light. The second or aftercharging can be by a special A-C corona device capable of neutralizing or in effect grounding the surface which device is used to restore the free surface of the layer of thermosplastic to a zero potential. In this condition, the positive charges are retained on the free surface of the thermoplastic in the areas exposed to the light by the forces caused by the negative charges trapped at the interface between the layer of plastic and layer of photo-conductive material. Subsequent to the aftercharging, development is accomplished by heating the plastic material to a temperature near its melting point. The softened plastic material will flow and in the area where the positive charges are attracted by the oppositely situated negative charges a depression will be formed to provide a surface relief or contour. It should be pointed out that this material can be erased by heating it to a slightly higher temperature so that the surface tension causes the plastic material to flow to form a flat surface. The above method has been proposed for a photographic method in an article by R. W, Gundlach and C. J. Claus, entitled "A Cyclic Xerographic Method Based on Frost Deformation." Photographic Science and Engineering, Vol. 7, No. 1, January-February 1963, pp. 14–19.

EXAMPLE 2

Another process for forming a surface relief on a storage medium utilizes a storage medium such as a tape or web having a photo lacquer layer applied to a suitable underlayer or carrier layer. The photo lacquer layer is exposed with a light beam modulated with the information to be recorded. Under the influence of the exposure, the organic molecules of the photo lacquer layer cross link and therefore become insoluble for certain solvents while the unexposed portions of the lacquer can be dissolved. Subsequent to exposure, the unexposed portions of the photo lacquer layer are removed by dissolving in the particular solution to provide a surface contour or relief on the tape or web. Various photo lacquer materials with a corresponding solvent are well known in the photo lacquer art.

EXAMPLE 3

A storage material comprising a photographic film material is first exposed with a modulated beam of light in accordance with the information to be recorded. After developing and fixing the photographic film, the portions of the film which are exposed become dark due to the light striking the photographic emulsion and causing silver to be released. The film is then bleached by being submersed in a bleaching bath of a bleaching agent or solution comprising, for example, 5 grams of potassium bichromate, 5 cc's of concentrated sulfuric acid dissolved in one liter of water. In the bleaching bath, for silver granules formed by the exposing of the photographic film are reformed into silver salt crystals that are permeable to light and have an index of refraction which differs from the rest of the film. The light passing through the storage medium therefore is no longer varied in its intensity but is phase modulated in accordance to the stored information which corresponds to the presence of the silver salts.

The storage medium which has a surface relief such as produced by Example 1 and 2 or which are produced by the above-mentioned mechanical processes can be utilized to print or reproduce other storage medium by a contact printing process. However, those storage mediums having alterations or modifications due to formation of the silver salts as in Example 3 or by the formation of the cross linking of the molecular structure of the thermoplastic film as mentioned above do not have the advantage of being reproducible by a contact printing process.

To retrieve the information from the storage tape, a device or apparatus such as illustrated schematically in FIG. 1 can be utilized. The device includes means for providing a retrieval beam of light having parallel waves with a single wave front such as a laser beam which is focused by a lens 1 to illuminate the storage medium such as a film 3. Preferably, the lens 1 focuses the laser beam to an area having a diameter equal to the diameter of the information point on the tape 3. The light passing through the storage medium is passed through a space frequency filter which comprises a lens 2 and a partition 4 having an aperture or iris. The light passing through the aperture in the partition 4 is projected onto a detector 5. The partition 4 and the lens 2 are arranged so that the partition 4 is at the focal plane of the lens 2 and the aperture of the partition 4 is at the focal point thereof. Thus, unmodulated light of the retrieval beam passing through the storage medium 3 is focused to pass through the aperture and be projected onto the detector 5. The presence of information in the form of either a surface relief or an internal modification in the material of the storage medium 3 causes a diffraction of the beam from the lens 1 to cause a phase modulation of the light beam resulting in a shifting of the focal point of the modulated beam passing through the lens 2 from the aperature on the partition 4 to reduce the amount of light striking the detector 5. Thus in the apparatus of device of FIG. 1, when no information is present on the storage medium 3, a maximum intensity of light is recorded by the detector 5. With the presence of the information, a portion of the light which is phase modulated by the information is not focused by the lens 2 to completely pass through the aperture or iris in the partition 4 to strike the detector. Thus the phase modulation causes a reduction in the intensity of the light striking the detector. By measuring the changes in the light intensity, the detector 5 will determine the content of the information. The filter comprising the lens 2 and a partition or diaphragm with the aperture is a means for converting a phase modulation into an amplitude or intensity modulation which can be recorded or detected by the detector 5. Instead of using a diaphragm 4, light conducting fibers having their apertures located in the position of the aperture of the partition 4 can be utilized in a similar manner.

Figure 2:
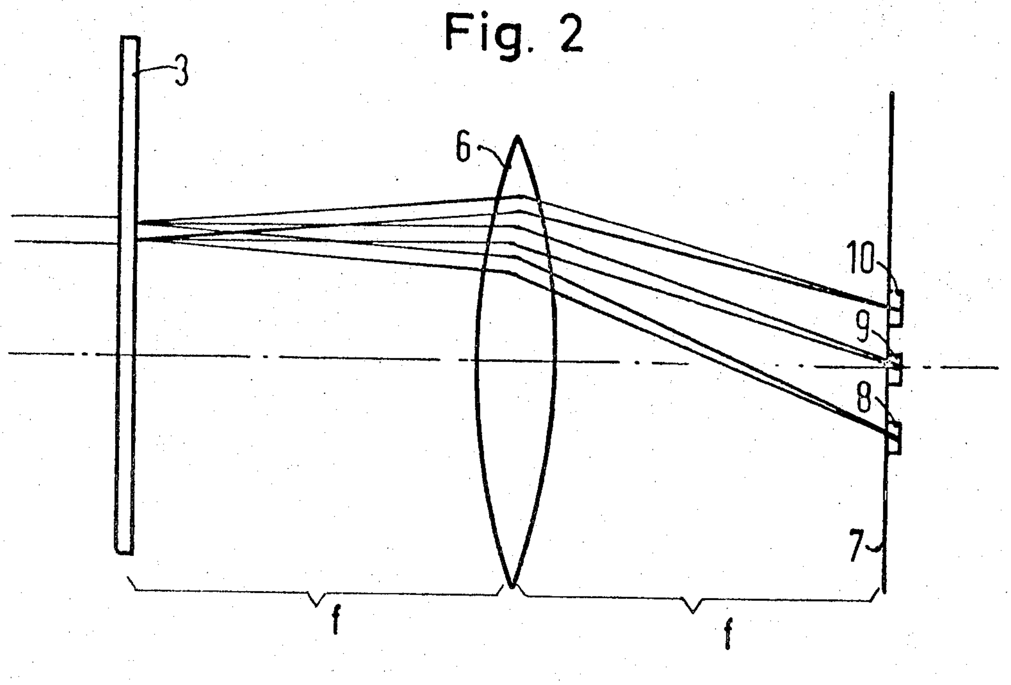
FIG. 2 is a schematic presentation of another embodiment of an apparatus for retrieving information recorded on a storage medium in accordance with the present invention.

Another apparatus or device, illustrated in FIG. 2, can be utilized for retrieving the information recorded on the storage medium 3. If the information of the storage medium is imprinted as mentioned above in fixed geometrical shaped recess or relief, a beam of light passing through the storage medium 3 will be diffracted into a fixed geometrical diffraction pattern. If no information is recorded, the beam of light passing through the medium 3 will be focused into a single point. In the device of FIG. 2, the storage medium 3 is in the front focal plane of a lens 6 and is illuminated with a beam of light having closely bundled parallel rays. In a rear focal plane 7 of the lens 6, coincident detectors such as 8, 9 and 10 are arranged in a particular geometrical pattern or patterns corresponding to predetermine diffraction patterns. When the geometrical shaped information imprint on the medium 3 causes a diffraction of the parallel beam of light into a diffraction pattern, the diffraction pattern is projected on to the detectors 8–10 which are arranged in that pattern. If no information is present, all the light passing through the storage medium 3 is received by a single detector located at the single point. When the detectors of a given pattern are illuminated due to the diffraction image caused by a particular geometrical embossment on the storage medium 3, a signal is recorded. While the system illustrated in FIG. 2 is utilized for retrieving information recorded as digital data, it can be used in a system having several patterns of detectors arranged in a matrix with each pattern determining the presence of a certain geometric diffraction pattern. Thus information associated with embossments having different geometric shapes could be detected and the presence of no embossment would be detected by the single detector at the focal point of the lens 6. Thus by imprinting different shapes on the tape of the storage medium, a series of individual bits of information can be stored and retrieved.

Figure 3:
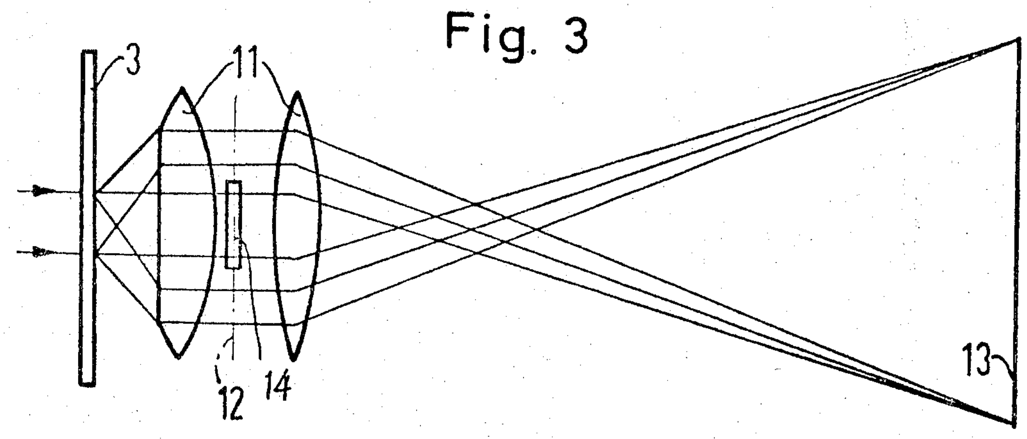
FIG. 3 is a schematic presentation of a third embodiment of an apparatus for retrieving information recorded on a storage medium in accordance with the present invention.

In FIG. 3, an apparatus is schematically illustrated which apparatus is similar to a phase contrast microscope. A beam of light projected through the storage medium 3 is received by the objectives 11 with a primary image formed at the focal plane 12 of the objectives 11. A secondary image is projected onto a screen or plane 13. Since an amplitude detecting device cannot determine changes in the phase of the light beam, a phase modulated beam would not be recorded by an amplitude detector. However, a phase modulated wave which is out of phase with the incident wave can be reconstructed as an incident wave and a diffracted wave. If the diffracted wave is one-half wave length out of phase with the incident light wave, the resulting wave of light will have a lower amplitude due to interference and is visually observed when compared with the incident wave or can be detected by an amplitude detector. By putting a phase shifter 14 on the rear focal plane 12 to shift the phase of the incident wave which is a zero order of diffracted light, the higher diffraction orders of the phase modulated light becomes intensity modulated or amplitude modulated with respect to the incident beam. By comparing the phase modulation between the incident light and the diffraction spector of the first and third orders, the difference amounts to approximately $\pi/2$ radians or one-fourth wave length. Thus the phase shifter 14 is selected to change the phase of the incident light beam by one-fourth of a wave length. As can be seen in FIG. 3, the diffracted light beams do not pass through the phase shifter 14 and thus a comparison between the diffracted light beams, which are caused by a phase modulation, and the incident light beam of the zero order results in an amplitude modulation which can be easily assertained by standard amplitude detectors.

In both of the devices illustrated in FIGS. 1 and 3, the purpose of the space frequency filter (FIG. 1) and the phase shifter (FIG. 3) are to convert a phase modulation into an amplitude or intensity modulation which can be detected by conventional intensity or amplitude detecting means. In the apparatus of FIG. 1, the phase modulated information is filtered out to reduce the amplitude or intensity of the light striking the detector 5. In the device of FIG. 3, the phase shifter 14 causes a shifting between the unmodulated incident waves and the phase modulated waves to enable amplitude detection in the phase modulated waves.

Although various minor modifications might be suggested by those versed in the art, it should be understood that we wish to employ within the scope of the patent warranted hereon all such modifications that reasonably and properly come within the scope of our contribution to the art.

We claim:

1. A process for recording information on a storage medium which is a plastic material and which information is retrieved by a method of projecting a retrieval beam of light on the medium to cause modulation of the retrieval beam in relation to the information stored on the medium, said method comprising the steps of:

receiving information to be recorded on the storage medium;

modulating a light beam with the information to be recorded to produce a modulated beam;

directing the modulated beam onto the storage medium; and generating a nearly point-formed concentrated internal alteration of the material of the storage medium below the surface thereof in response to the information of the modulated beam, said step of generating the internal alteration comprising creating in response to the modulated beam a partial cross linking of the molecules of the plastic material to alter the molecular structure of the plastic storage medium at the point of the alteration with regard to the remaining portions of the plastic storage material whereby the cross linked molecules have a difference index refraction than the molecules in the unaltered portions and said alterations causing the wave front of a retrieval beam of light projected at the storage medium to be phase modulated in response to the information stored in said medium.

* * * * *